(12) United States Patent
Fitz Román

(10) Patent No.: US 9,097,270 B2
(45) Date of Patent: Aug. 4, 2015

(54) SNAP FIT FASTENER

(71) Applicant: GM GLOBAL TECHNOLOGY OPERATIONS LLC, Detroit, MI (US)

(72) Inventor: Lennin Fitz Román, Nezahualcoyotl (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/951,910

(22) Filed: Jul. 26, 2013

(65) Prior Publication Data

US 2015/0030413 A1 Jan. 29, 2015

(51) Int. Cl.
*F16B 2/22* (2006.01)

(52) U.S. Cl.
CPC ........................................ *F16B 2/22* (2013.01)

(58) Field of Classification Search
CPC ....... A44B 17/00; F16B 5/0657; F16B 21/02; F16B 5/065; B29C 66/47; B29C 65/58; Y10T 24/30; Y10T 24/44; Y10T 24/302–24/303; Y10T 24/309; Y10T 24/44026; Y10T 24/44017
USPC .................. 52/716.6, 716.7, 718.04, 718.06, 52/718.03; 24/457–458, 573.09, 580.1, 24/580.11, 581.11, 289–297, 663, 90.1, 24/109, 110, 455; 411/45–48, 508–511, 411/182, 480, 533, 902–903, 349, 913, 112
See application file for complete search history.

(56) References Cited

U.S. PATENT DOCUMENTS

| | | | | |
|---|---|---|---|---|
| 2,194,855 | A * | 3/1940 | Jones | 24/293 |
| 2,198,186 | A * | 4/1940 | Tinnerman | 24/294 |
| 4,534,088 | A * | 8/1985 | Ricke | 24/295 |
| 5,353,571 | A * | 10/1994 | Berdan et al. | 52/716.5 |
| 6,839,943 | B2 * | 1/2005 | Burkhardt et al. | 24/458 |
| 8,516,770 | B2 * | 8/2013 | Bissinger et al. | 52/716.6 |
| 8,564,433 | B2 * | 10/2013 | Malkin et al. | 340/539.13 |
| 8,627,552 | B2 * | 1/2014 | Smith et al. | 24/295 |
| 8,800,120 | B2 * | 8/2014 | Benedetti | 24/458 |
| 8,875,357 | B2 * | 11/2014 | Reznar et al. | 24/458 |
| 2005/0044672 | A1 * | 3/2005 | MacPherson et al. | 24/293 |
| 2006/0117535 | A1 * | 6/2006 | Fraser et al. | 24/289 |
| 2006/0168773 | A1 * | 8/2006 | Smith et al. | 24/295 |

* cited by examiner

*Primary Examiner* — Jeanette E Chapman
(74) *Attorney, Agent, or Firm* — Quinn Law Group, PLLC

(57) ABSTRACT

A snap fit fastener includes a base, a holder, and a plurality of snap fit arms. The holder extends from the base and includes a holder wall defining a fastener hole. The fastener hole is sized to receive a finger. The snap fit arms are cantilevered from the base. Each snap fit arm includes a beam and an overhang protruding from the beam in a direction away from the holder. Each overhang is configured to engage a panel to couple the snap fit fastener to the panel.

5 Claims, 2 Drawing Sheets

SNAP FIT FASTENER

TECHNICAL FIELD

The present disclosure relates to fasteners, assemblies, and methods of attaching two parts together.

BACKGROUND

Many assembly operations use fasteners, such as bolts or screws, to couple two separate parts together. In many assembly operations, it is desirable to secure the fastener to one of the parts to be joined prior to assembly in order to more quickly and efficiently couple the parts together. It is also desirable to develop fasteners capable of being used in areas hard to manually reach during assembly.

SUMMARY

The present disclosure relates to snap fit fasteners for coupling parts together. In an embodiment, the snap fit fastener includes a base, a holder, and a plurality of snap fit arms. The holder extends from the base and includes a holder wall defining a fastener hole. The fastener hole is sized to receive a finger. The snap fit arms are cantilevered from the base. Each snap fit arm includes a beam and an overhang protruding from the beam in a direction away from the holder. Each overhang is configured to engage a panel to couple the snap fit fastener to the panel.

In an embodiment, the snap fit arms are disposed around the holder. The snap fit fastener may include ribs disposed between the base and the holder. The base may have a substantially planar shape. The snap fit arms may be resiliently coupled to the base. The snap fit arms may be directly connected to the base. The holder may include an arch-shaped wall portion.

The present disclosure also relates to vehicles such as cars and trucks. In an embodiment, the vehicle includes a first panel and a second panel. The second panel includes a first panel surface and a second panel surface opposite the first panel surface. The second panel defines a panel hole extending through the first panel surface and the second panel surface. The vehicle further includes a snap fit fastener including a base attached to the first panel. The snap fit fastener includes a holder extending from the base and defining a fastener hole. The snap fit fastener also includes a plurality of snap fit arms cantilevered from the base. The holder is configured to be received through the panel hole. The fastener hole is configured to receive a human finger. Each snap fit arm partially extends through the panel hole and includes an overhang having an abutment surface. The abutment surfaces of each overhang contact the second panel surface to couple the first panel to the second panel.

In an embodiment, the holder may have a substantially U-shape. The base defines an edge, and the snap fit arms may be disposed along the edge of the base. The snap fit arms may be directly connected to the base. Each snap fit arm includes a beam and the overhang protrudes from the beam in a direction away from the holder. The base may have a planar configuration. The holder includes a holder wall having an arch-shaped wall portion. The snap fit arms may be resiliently coupled to the base. The snap fit arms are disposed around the holder. The vehicle may further include ribs disposed between the base and the holder.

The present disclosure also relates to method of manufacturing a vehicle. In an embodiment, the method includes a step of inserting a holder and snap fit arms of a snap fit fastener attached to a first vehicle member through a vehicle member hole of a second vehicle member. The snap fit fastener includes a base. The holder extends from the base. The snap fit arms are supported by the base. The holder defines a fastener hole. The method further includes advancing the snap fit arms through the vehicle member hole by applying a force to the snap fit fastener via the holder until the snap fit arms engage the second vehicle member to couple the first member to the second member.

In an embodiment, the method further includes attaching the base of the snap fit fastener to the first vehicle member before inserting the holder and the snap fit arms through the vehicle member hole. The advancing step includes pulling the snap fit arms through the vehicle member hole via the holder using a finger.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figures 1, 2, 3, 4:
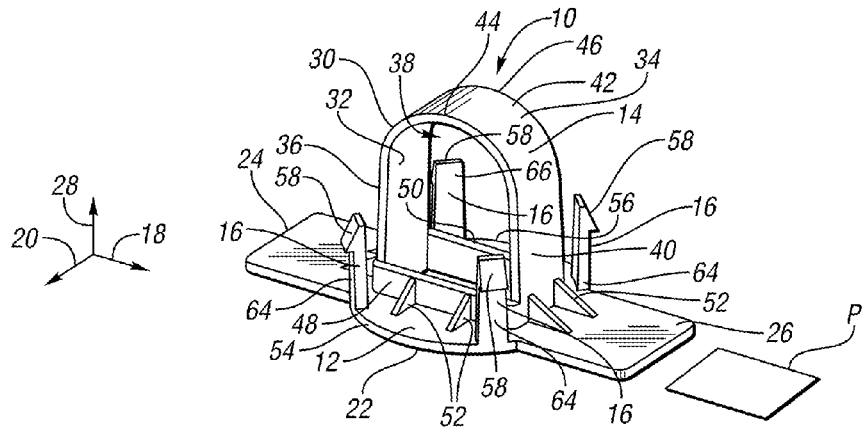
FIG. 1 is a schematic perspective view of a fastener in accordance with an embodiment of the present disclosure, wherein the fastener includes a base, holder, and a plurality of snap fit arms.
FIG. 2 is a schematic cross-sectional view of one snap fit arm of the snap fit fastener of FIG. 1.
FIG. 3 is a schematic perspective view of the fastener of FIG. 1 affixed to a first panel and adjacent to a second panel defining a hole.
FIG. 4 is a schematic perspective view of the fastener of FIG. 1, showing only a portion of the holder extending through the hole of the second panel.

Referring to the drawings, wherein like reference numerals are used to identify like or identical components in the various views, FIG. 1 schematically illustrates a snap fit fastener 10 for coupling at least two components. The snap fit fastener 10 generally includes base 12, a holder 14 extending from the base 12, and one or more snap fit arms 16 supported by the base 12. The snap fit arms 16 may partially surround the holder 14. In other words, the snap fit arms 16 are disposed around the holder 14. In the depicted embodiment, the snap fit fastener 10 includes four snap fit arms 16; however, it is contemplated that the snap fit fastener 10 may include more or fewer snap fit arms 16. Irrespective of the number of snap fit arms 16, the snap fit fastener 10 is configured to couple two components together.

During assembly of a machine, such as a vehicle, it might be difficult to manually reach different areas of the partially assembled machine to install a conventional fastener in order to connect two or more parts of the machine together. It is therefore desirable to develop a fastener that is easy to install even in areas of the partially assembled machine that are hard to reach. The snap fit fastener 10 can connect two parts together and can be easily reached by a user via the holder 14 as described in detail below.

With continued reference to FIG. 1, the snap fit fastener 10 may be wholly or partly made of a substantially rigid material, such as a metal or plastic, and includes a base 10, which may be elongated along a first direction indicated by arrow 18. The base 10 may have a substantially thin, planar configuration and may therefore extend along a plane P defined along the first direction indicated by arrow 18 and a second direction indication by arrow 20. The first direction indicated by arrow 18 may be substantially perpendicular to the second direction indicated by arrow 20. In the embodiment depicted in FIG. 1, the base 10 includes a first or central base portion 22, a second base portion or extension 24, and a third base portion or extension 26. The first base portion 22 is disposed between the second base portion 24 and the third base portion 26 and may have a substantially circular shape. Moreover, the first base portion 22 includes a first base edge 54 and a second base edge 56 opposite to the first base edge 54. The second base edge 56 is spaced from the first base edge 54 along the second direction indicated by arrow 20. The second base portion 24 and the third base portion 26 extend from the first base portion 22 in opposite directions and each may have a substantially rectangular shape. The base 12 can be attached a first body 100 (FIG. 3), such as a first vehicle member 102, using any suitable coupling means such as adhesives or welding. The first body 100 (FIG. 3) of may be a first panel 104 of a vehicle 98 or any other machine or assembly.

With continued reference to FIG. 1, the holder 14 of the snap fit fastener 10 allows a user to pull the snap fit fastener 10 using a finger and extends from the base 14 in a third direction indicated by arrow 28. The third direction indicated by arrow 28 may be substantially perpendicular to the first direction indicated by arrow 18 and the second direction indicated by arrow 20. The holder 14 extends from the first base portion 22 of the base 12 and may have a substantially U-shape.

The holder 14 may include a holder wall 30 having an inner holder surface 32 and an outer holder surface 34 opposite to the inner holder surface 32. The inner holder surface 32 defines a fastener hole 38 configured, sized, and shaped to receive an adult human finger or at least a portion of a holding instrument such as a hook. The holder wall 30 further includes a first holder edge 44 and a second holder edge 46 opposite to the first holder edge 44. The second holder edge 46 is spaced from the first holder edge 44 along the second direction indicated by arrow 20.

The holder wall 30 may have a substantially U-shape and includes a first wall portion 36 attached to the base 12, a second wall portion 40 attached to the base 12, and a third wall portion 42 interconnecting the first wall portion 36 and the second wall portion 40. The first wall portion 36 and the second wall portion 40 may be attached to the same portion of the base 12, such as the first base portion 22, but are spaced apart from each other along the first direction indicated by arrow 18. Furthermore, the first wall portion 36 and the second wall portion 40 may be elongated along the third direction indicated by arrow 28 and may have a substantially planar configuration. The third wall portion 42 may be disposed between the first wall portion 36 and the second wall portion 40 and have a substantially arch or semi-circular shape. The third wall portion 42 may therefore be referred to as the arch-shaped wall portion. The first wall portion 36, the second wall portion 40, and third wall portion 42 collectively define the fastener hole 38. During use, the user may insert a human finger or a holding instrument, such as a hook, through the fastener hole 38 to hold and move the snap fit fastener 10 in a desired direction.

The snap fit fastener 10 additionally includes a first support wall 48 coupled between the base 12 and the first holder edge 44 and a second support wall 50 coupled between the base 12 and the second holder edge 46. The first support wall 48 and the second support wall 50 helps maintain the holder 14 in a fixed position relative to the base 12 and each may be elongated along the first direction indicated by arrow 18. Each of the first support wall 48 and the second support wall 50 extends from a portion of the base 12, such as the first base portion 22, in the third direction indicated by arrow 28.

In addition to the first and second support walls 48, 50, the snap fit fastener 10 includes a plurality of ribs 52 to help maintain the holder 14 in a fixed position relative to the base 12. It is envisioned, however, that the snap fit fastener 10 may include only one rib 52. The ribs 52 may be located in different parts of the snap fit fastener 10. For instance, the ribs 52 may be disposed between the base 12 and the holder 14. The ribs 52 may be coupled between the first support wall 48 and the base 12. The ribs 52 may be coupled between the second support wall 50 and the base 12. The ribs 52 may be coupled between the first wall portion 36 and the base 12. The ribs 52 may be coupled between the second wall portion 40 and the base 12. Although the ribs 52 shown in the drawings have a substantially triangular shape, it is envisioned that the snap fit fastener 10 may include ribs having other suitable shapes. Irrespective of their shape or number, the ribs 52 can enhance the structural integrity of the snap fit fastener 10.

With reference to FIG. 3, the snap fit fastener 10 also includes one or more snap fit arms 16 extending from a portion of the base 12, such as the first base portion 22, in the third direction indicated by arrow 28. Each of the snap fit arms 16 is configured to engage a second body 106 (FIG. 3), such as a second vehicle member 108, in order to couple the first body 100 to the second body 106 when the base 12 is attached to the first body 100 (FIG. 3) as described in detail below. The second body 106 may be a second panel 109 of the vehicle 98 (FIG. 3). The first body 100 and the second body 106 may be wholly or partly made of a substantially rigid material such as metal or plastic.

Returning to FIG. 1, the snap fit arms 16 may be configured as snap fit hooks 58 and are cantilevered from a portion of the base 12 such as the first base portion 22. Specifically, the snap fit arms 16 are resiliently coupled to the base 12. Accordingly, each snap fit arm 16 can deflect or flex upon application of a force; however, each snap fit arm 16 returns to its original position relative to the base 12 when it is no longer subjected to said force. The snap fit arms 16 may be arranged annularly along the first base portion 22. For example, one snap fit arm 16 may be disposed along the first base edge 54 adjacent the intersection between the first base portion 22 and the second base portion 24. Another snap fit arm 16 may be disposed along the first base edge 54 adjacent the intersection between the first base portion 22 and the third base portion 26. Another snap fit arm 16 may be disposed along the second base edge 56 adjacent the intersection between the first base portion 22 and the second base portion 24. Another snap fit arm 16 may be disposed along the second base edge 56 adjacent the intersection between the first base portion 22 and the third base portion 26.

With reference to FIG. 2, each snap fit arm 16 may include a cantilever beam 60 elongated along a beam axis 62. The cantilever beam 60 may be directly or indirectly connected to the base 12 (FIG. 1) and is configured to deflect or flex when subjected to a force. Thus, the snap fit arms 16 may be directly or indirectly connected to the base 12. Furthermore, the cantilever beam 60 includes a first beam end portion 64 (FIG. 1) coupled to the base 12 and a second beam end portion 66 opposite to the first beam end portion 64. Each cantilever beam 60 may have a beam depth D1.

With continued reference to FIG. 2, each snap fit arm 16 includes an overhang 68 extending from the second beam end portion 66 of the cantilever beam 60. The overhangs 68 of each snap fit arm 16 may protrude from the second beam end portion 66 in a direction away from the holder 14 (see FIG. 1). The overhang 68 includes a ramp 70 obliquely angled relative to the beam axis 62 and an abutment surface 72, which may be angled substantially perpendicular relative to the beam axis 62. As described in detail below, the ramp 70 facilitates connecting the snap fit fastener 10 to the second body 106 (FIG. 3), while the abutment surface 72 is configured to abut the second body 106 to prevent, or at least inhibit, the snap fit fastener 10 from decoupling from the second body 106. The overhang 68 defines an overhang depth D2 that may be larger or smaller than the beam depth D1.

With reference to FIG. 3, the snap fit fastener 10 may be part of a fastening assembly 74 that also includes the first body 100 and the second body 106. In turn, the fastening assembly 74 may be part of a vehicle 98 such as a car or truck. As discussed above, the base 12 of the snap fit fastener 10 is attached to the first body 100 using any suitable means such as welding, soldering, brazing, and adhesives. The second body 106 includes an inner body surface 111 defining a body hole 110, which may have a substantially circular shape. Because the second body 106 may be the second vehicle member 108 or a second panel 109, the body hole 110 may also be referred to as a vehicle member hole or panel hole. The second body 106 may include a first or inner body surface 112 (e.g., first vehicle member surface or first panel surface) and a second or outer body surface 114 (e.g., second vehicle member surface or second panel surface) opposite the first body surface 112. The body hole 110 extends through the first body surface 112 and the second body surface 114 and is configured, shaped, and sized to receive at least a portion of the holder 14 and the snap fit arms 16 (FIG. 1).

Figure 5:
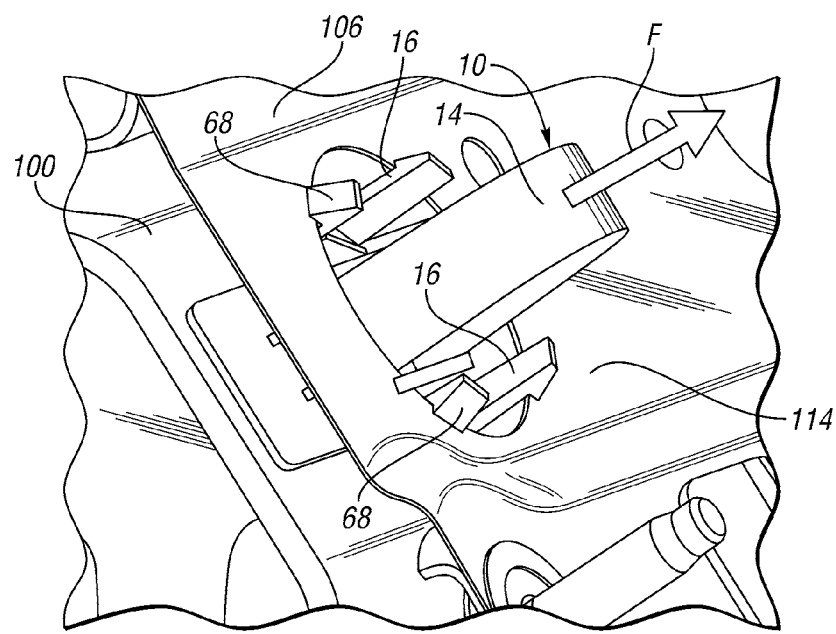
FIG. 5 is a schematic perspective view of the fastener of FIG. 1, showing the holder and a portion of the snap fit arms extending through the hole of the second panel.
Figure 6:
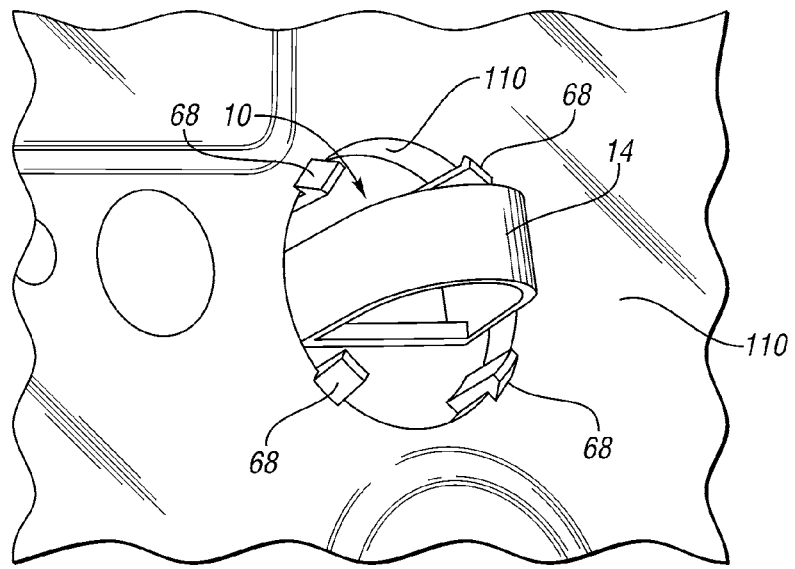
FIG. 6 is a schematic perspective view of the fastener of FIG. 1, showing the snap fit arms engaging the second panel.

With reference to FIGS. 3-6, the present disclosure also relates to methods of fastening the first body 100 to the second body 106 using the snap fit fastener 10. The presently disclosed fastening method may be part of a method of manufacturing the vehicle 98. First, the base 12 of the snap fit fastener 12 is attached to the first body 100 using welding, adhesives or any other suitable coupling means or methods as seen in FIG. 3 before performing other steps. The fastening method may also include forming the body hole 110 in the second body 106 using any suitable tool or means such as a drilling. Then, the snap fit fastener 10 along with the attached first body 100 are advanced toward the body hole 110 until at least the holder 14 is partially extending through the body hole 110 as seen in FIG. 4. To do so, the user may insert his or her finger (e.g. a human finger) or a tool (e.g., hook) through the fastener hole 38 (FIG. 1) defined by the holder 14 and then apply a force in the direction indicated by arrow F. This force may be applied by pulling the snap fit fastener 10 via the holder 14 with the finger or a tool such as a hook. The user continues to apply the force in the direction indicated by arrow F to move the snap fit arms 16 through the body hole 110. In doing so, the ramps 70 (FIG. 2) of the snap fit arms 16 slide along the inner body surface 111, thereby facilitating entry of the snap fit arms 16 into the body hole 110. As the ramps 70 of the snap fit arms 16 slide along the inner body surface 111, the cantilever beams 60 deflect inwardly (i.e., toward the holder 14) to allow at least a portion of the snap fit arms 16 to move through the body hole 110. The continued application of the force to the snap fit fastener 10 via the holder 14 in the direction indicated by arrow F eventually causes the overhangs 68 of each snap fit arm 16 to engage the second body 106, thereby coupling the first body 100 to the second body 106 via the snap fit fastener 10 as shown in FIG. 5. At this juncture, the abutments surfaces 72 (FIG. 2) of each overhang 68 contacts the second body surface 114 of the second body 106 and therefore prevents, or at least hinders, the snap fit fastener 10 from being decoupled from the second body 106 as shown in FIG. 6.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A snap fit fastener for fastening a panel, comprising:
a base defining a substantially planar base surface;
a holder extending from the base, the holder including a holder wall defining a fastener hole;
a plurality of snap fit arms cantilevered from the base, each snap fit arm including a cantilever beam and an overhang protruding from the cantilever beam away from the holder;
wherein each cantilever beam includes a first beam end portion and a second beam end portion opposite the first beam end portion, the second beam end portion is free, the first beam end portion is coupled to the base, and the overhang protrudes directly from the second beam end portion; and
wherein each overhang is configured to engage the panel to couple the snap fit fastener to the panel;
wherein the holder wall includes a first wall portion, a second wall portion, and a third wall portion, the third wall portion being arch-shaped and interconnecting the first and second wall portions; and
the first and second wall portions being connected to the base such that the first and second wall portions and each cantilever beam extend in a direction substantially perpendicular to the substantially planar base surface.

2. The snap fit fastener of claim 1, wherein each cantilever beam extends along a beam axis, the beam axis extends perpendicular to the substantially planar base surface, the overhang includes a ramp obliquely angled relative to the beam axis and an abutment surface directly connected to the ramp, and the abutment surface is perpendicular to the beam axis.

3. The snap fit fastener of claim 1, wherein the holder wall defines a first holder edge and a second holder edge opposite the first holder edge, the second holder edge is spaced apart from the first holder edge, and the snap fit fastener includes a first support wall coupled between the base and the first holder edge and a second support wall coupled between the base and the second holder edge.

4. The snap fit fastener of claim 3, further comprising ribs coupled between the base and the first support wall, wherein the ribs are directly connected to the base, and the ribs are directly connected to the first support wall.

5. The snap fit fastener of claim 1, wherein the first beam end portion of each cantilever beam is connected to the base at a location that is spaced apart from a location where the first wall portion is connected to the base and from a location where the second wall portion is connected to the base.

* * * * *